(12) United States Patent
Sato

(10) Patent No.: US 9,470,958 B2
(45) Date of Patent: Oct. 18, 2016

(54) LENS DRIVING APPARATUS, LENS BARREL AND OPTICAL APPARATUS

(71) Applicant: CANON KABUSHIKI KAISHA, Tokyo (JP)

(72) Inventor: Koji Sato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/694,612

(22) Filed: Apr. 23, 2015

(65) Prior Publication Data
US 2015/0309388 A1 Oct. 29, 2015

(30) Foreign Application Priority Data

Apr. 28, 2014 (JP) ................................ 2014-092366

(51) Int. Cl.
G03B 17/00 (2006.01)
G03B 13/34 (2006.01)
G02B 7/04 (2006.01)

(52) U.S. Cl.
CPC ............. G03B 13/34 (2013.01); G02B 7/04 (2013.01)

(58) Field of Classification Search
CPC .................................................. G03B 13/34
USPC ......................................................... 396/85
See application file for complete search history.

(56) References Cited

U.S. PATENT DOCUMENTS

| 6,553,185 | B1* | 4/2003 | Inaba | G03B 17/00 |
| | | | | 359/676 |
| 6,643,459 | B2* | 11/2003 | Ota | H04N 5/2251 |
| | | | | 348/333.09 |
| 7,339,756 | B2 | 3/2008 | Tengeiji et al. | |
| 2009/0123145 | A1* | 5/2009 | Nomura | G02B 7/102 |
| | | | | 396/529 |
| 2010/0310245 | A1* | 12/2010 | Honjo | G02B 7/08 |
| | | | | 396/85 |
| 2013/0162860 | A1* | 6/2013 | Uehara | H04N 5/2251 |
| | | | | 348/222.1 |

FOREIGN PATENT DOCUMENTS

| JP | 590418 U | 12/1993 |
| JP | 06174992 A | 6/1994 |
| JP | 08110460 A | 4/1996 |
| JP | 2007298718 A | 11/2007 |

* cited by examiner

Primary Examiner — W B Perkey
Assistant Examiner — Dennis Hancock
(74) Attorney, Agent, or Firm — Rossi, Kimms & McDowell LLP

(57) ABSTRACT

The lens driving apparatus includes a lens holding member that holds lens; a rack provided in the lens holding member transmits a motor driving force to the lens holding member; a first guide part that supports the lens holding member to be movable back and forth in an optical axis direction of the optical lens; a second guide part that supports the lens holding part to be movable as a first guide part, farther separated from the rack than the first guide part in a direction orthogonal to the optical axis direction; both contact parts in the lens holding part, with which both guide parts respectively are in contact; and an energizing part that energizes the second contact part at a position separated in the longitudinal direction of the second guide part so as to be in contact with the second guide part.

8 Claims, 5 Drawing Sheets

LENS DRIVING APPARATUS, LENS BARREL AND OPTICAL APPARATUS

BACKGROUND OF THE INVENTION

1. Field of the Invention

The present invention relates to a lens driving apparatus, a lens barrel, and an optical apparatus.

2. Description of the Related Art

Conventionally, a lens driving apparatus that moves a lens group by using a stepping motor when performing a variable power operation and a focusing operation has been mounted on a lens barrel used as an interchangeable lens or the like in an optical apparatus, for example, a digital still camera and a video camera. Such a lens driving apparatus that moves a guide that guides a movement of the lens during moving back and forth of the lens and a lens holding frame without a wobble between them is desired. Japanese Patent Application Publication No. 6-174992 discloses a configuration in which a regulation of a rotation blur is achieved by a rack configuration that has interposing teeth that interpose a motor screw in a rack. Additionally, Japanese Patent Application Publication No. 2007-298718 discloses a configuration in which the regulation of the rotation blur is achieved by a configuration in which the rack is pressed against the motor screw.

However, in the conventional arts disclosed in the aforementioned patent documents, there is a possibility that a stable balance cannot be configured when, for example, an attitude is changed in a case where the mass of the lens group is large, thereby to cause a tilt of the lens group and the rotation blur. Additionally, it may affect an optical property, for example, an image shake, as a result. For example, Japanese Patent Application Publication No. 6-174992 discloses a configuration in which the interposing teeth that interpose the motor screw are provided in the rack, an angle is given to the interposing teeth, and an energizing force is applied to the lens group. Here, it is necessary to increase an interposing force or increase the angle of the interposing teeth in order to increase the energizing force to correspond to the mass of the lens group. Accordingly, there is a problem in which a load that obstructs the rotation of the motor becomes high in many cases. Although the disclosure of Japanese Patent Application Publication No. 2007-298718 enables decreasing the load to the motor compared with the disclosure of Japanese Patent Application Publication No. 6-174992, both disclosures require increasing the energizing force of the rack according to the increase of the mass of the lens group, and thus, it is difficult to avoid the similar problem to be solved.

SUMMARY OF THE INVENTION

The present invention provides, for example, a lens driving apparatus and the like that enables stably energizing a lens group without increasing the rotation load of a motor and controlling an unintended tilt and a rotation blur.

A lens driving apparatus in the present invention includes a lens holding member that holds an optical lens; a rack provided in the lens holding member and that transmits a motor driving force to the lens holding member; a first guide part that supports the lens holding member so as to be movable back and forth in an optical axis direction of the optical lens; a second guide part that supports the lens holding member so as to be movable back and forth in the optical axis direction, farther separated from the rack than the first guide part in a direction orthogonal to the optical axis direction; a first contact part and a second contact part provided in the lens holding member, with which the first guide part and the second guide part respectively are in contact; and an energizing member that energizes the second contact part at a position separated in the longitudinal direction of the second guide part so as to be in contact with the second guide part.

Further features of the present invention will become apparent from the following description of exemplary embodiments with reference to the attached drawings.

DESCRIPTION OF THE EMBODIMENTS

Hereinafter, the embodiments of the present invention will be described with reference to drawings and the like.

(First Embodiment)

Figure 1:
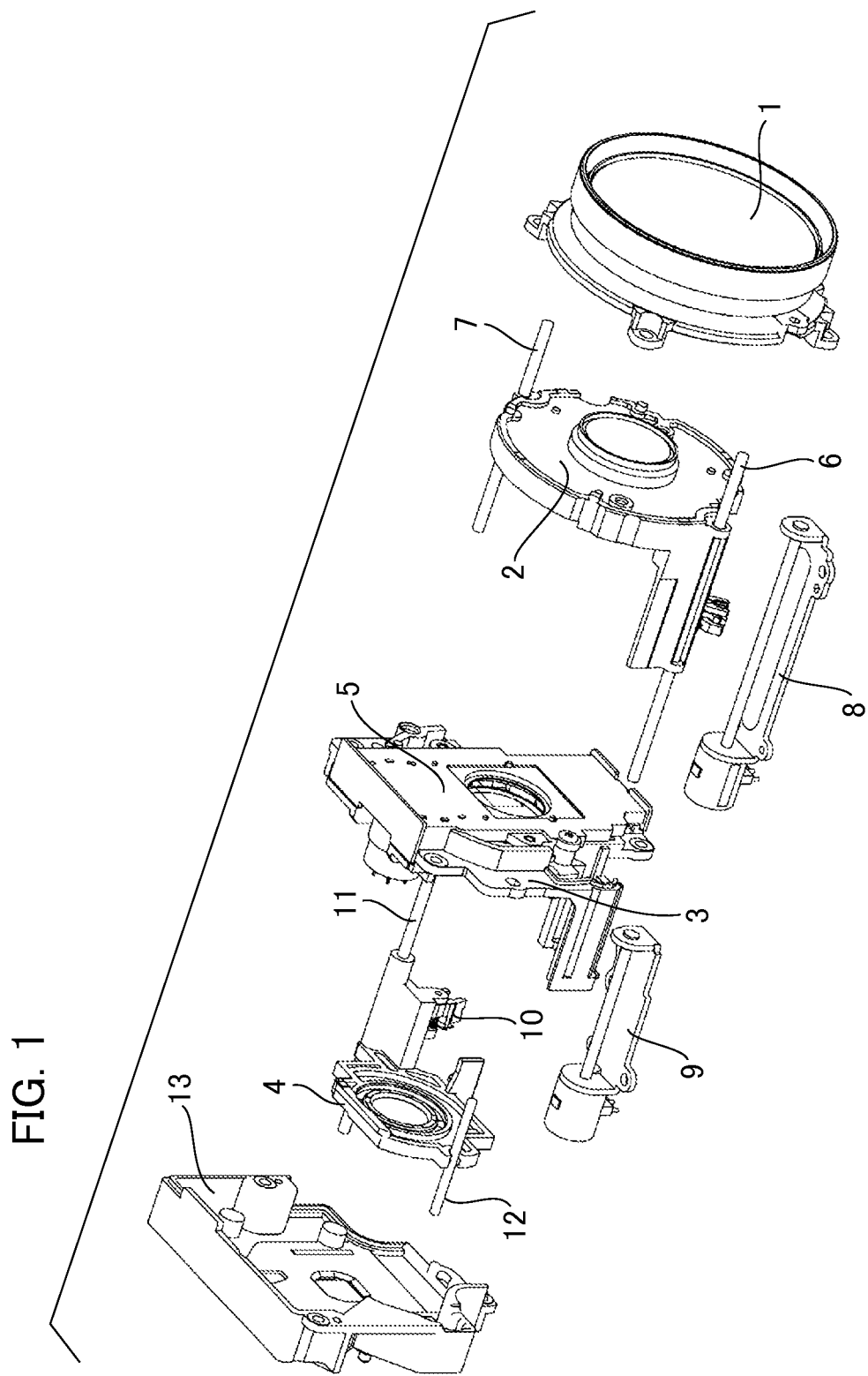
FIG. 1 is an exploded perspective view that illustrates a configuration of a lens barrel that can mount a lens driving apparatus according to first embodiment of the present invention.

First, a description will be given of a lens barrel (lens device) that can mount a lens driving apparatus according to first embodiment of the present invention. FIG. 1 is an exploded perspective view that illustrates a configuration of a lens barrel according to first embodiment, and a fixed cylinder that fixes each of components is not illustrated for the purpose of simplifying the description. The lens barrel according to the present embodiment is an interchangeable lens that is attachable to and detachable from an image capturing apparatus (optical apparatus), for example, a digital still camera provided with an imaging element or a still camera using a silver film, in one example. However, the lens barrel according to the present embodiment may be one that is incorporated in the image capturing apparatus, not limited to being incorporated in the image capturing apparatus, and it may be, for example, an interchangeable lens that is attachable to and detachable from a projection device such as a projector, or it may be one that is incorporated in the projection device. As shown in FIG. 1, the lens barrel includes an optical lens group 1, a variable power lens group 2, a focus comparison lens group 3, a focusing lens group 4, and a holder 13, and photographing is allowed by placing an imaging element (not illustrated) at the rear of the holder 13.

Figure 2:
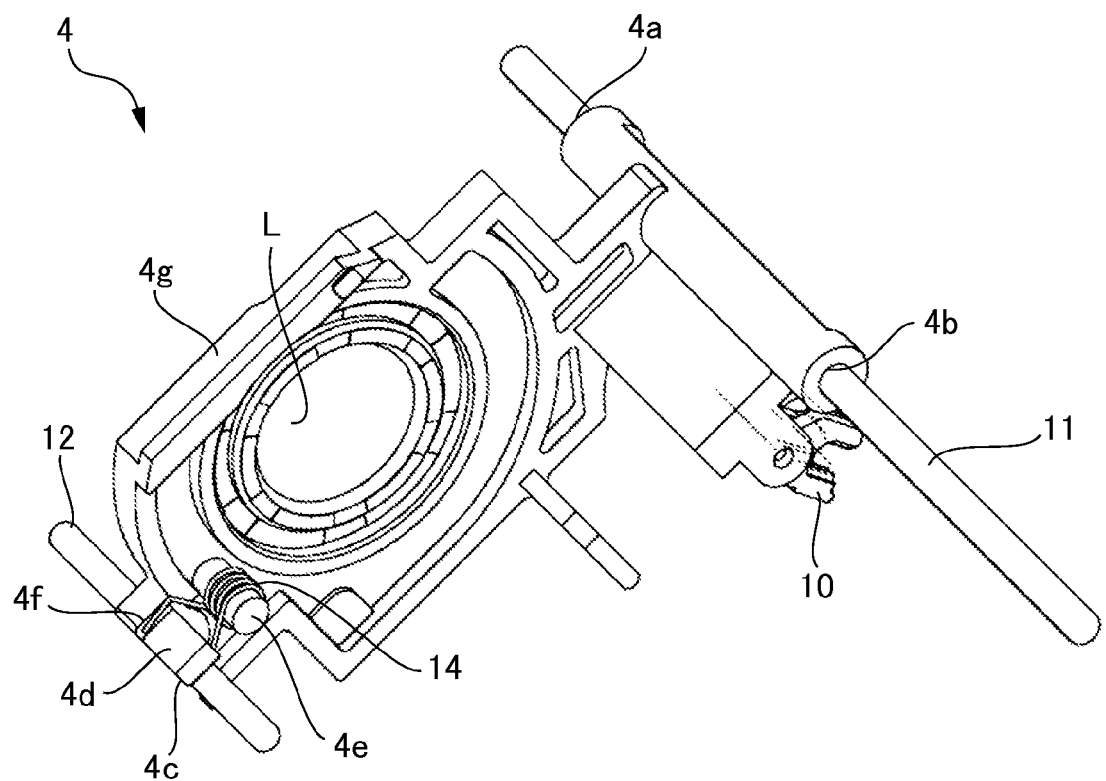
FIG. 2 is a perspective view that illustrates a configuration of the lens driving apparatus according to the first embodiment.

Next, a description will be given of the lens driving apparatus that moves the lens group in an optical axis direction K. FIG. 2 is a perspective view that illustrates a configuration of the lens driving apparatus according to the present embodiment. Here, a case in which the aforementioned focusing lens group is driven is given as an example. Such a lens driving apparatus includes the focusing lens group 4, a rack (rack member) 10, a guide bar (first guide part), a guide bar 12 (second guide part), and a spring 14 (energizing member, elastic material). Additionally, the focusing lens group 4 includes a lens L and a lens holding frame (lens holding member) 4g that holds the lens. The rack 10 is attached to the lens holding frame 4g, engaged with a screw part of a motor 9, transmits the rotation of the motor 9 (motor driving force) to the lens holding frame 4g, and thus, the focusing lens group 4 can be driven back and forth in the optical axis direction K. The lens holding frame 4g is provided with a sleeve hole (opening, first contact part) 4a and a sleeve hole (opening, first contact part) 4b that are in contact with a guide bar 11 to guide it and it is held (supported) so as to be movable back and forth by the guide bar 11 in the optical axis direction K. A rotation regulating part (rotation regulating groove, second contact part) 4c interposes (is in contact with) a guide bar 12 and has the function of regulating a position of the lens holding frame 4g in a rotation direction orthogonal to the optical axis direction K, and a function to regulate a rotation blur that occurs during moving back and forth of the lens holding frame 4g. The guide bar 12 holds the lens holding frame 4g so as to be movably back and forth in the optical axis direction K, and it is farther separated from the rack 10 than the guide bar 11 in the direction orthogonal to the optical axis direction K. The spring 14 is a torsion spring attached around a spring hanging part 4e having a substantially cylindrical shape, which is provided at the lens holding frame 4g. One end of the spring 14 is held at a spring receiving groove 4f provided in a spring receiving part 4d and the other end thereof is positioned by being hooked on the guide bar 12, and an energizing force is generated between the lens holding frame 4g and the guide bar 12.

Figure 3A:
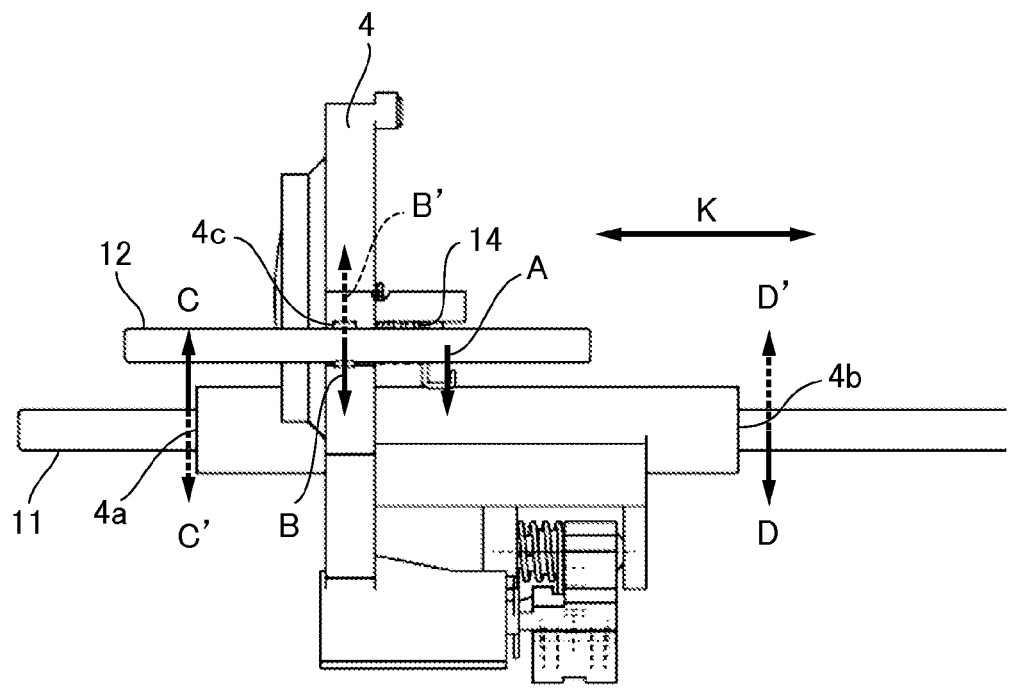
FIG. 3A is a side view of an explanatory view that explains the operation of the lens driving apparatus according to the first embodiment.
Figure 3B:
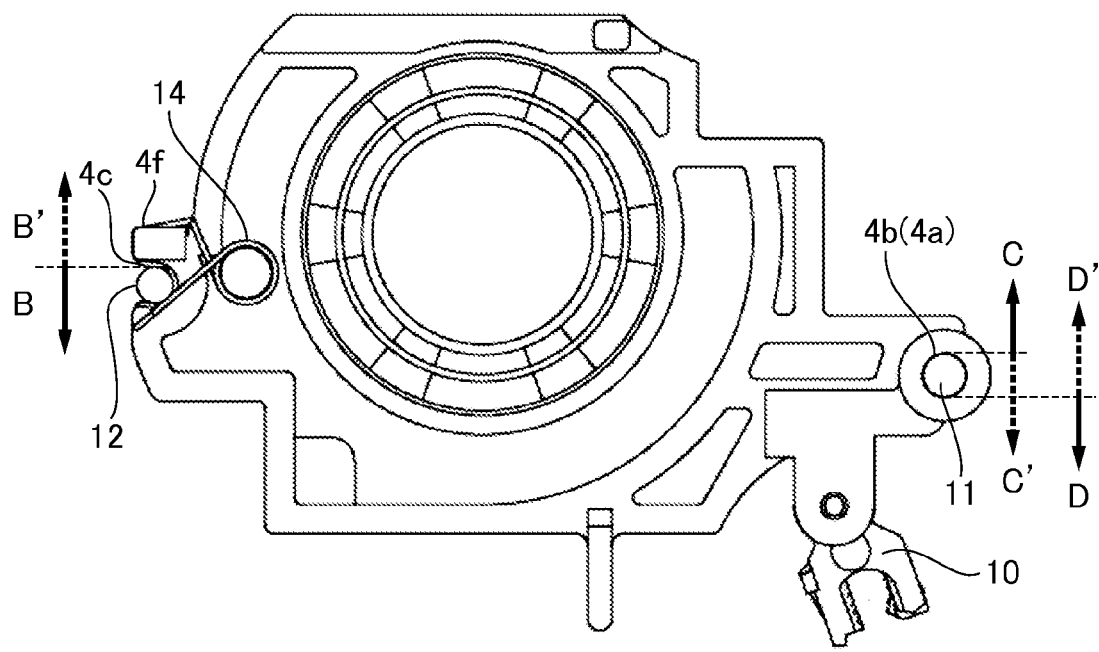
FIG. 3B is a front view of the explanatory view that explains the operation of the lens driving apparatus according to the first embodiment.

A detailed description will be given of the operation of such lens driving apparatus with reference to FIGS. 3A and 3B. FIGS. 3A and 3B are explanatory views that explain the operation of the lens driving apparatus according to the present embodiment, FIG. 3A is a side view and FIG. 3B is a front view. As shown in FIGS. 3A and 3B, the spring 14 can generate an energizing force A between the spring receiving groove 4f provided in the lens holding frame 4g and the guide bar 12. In other words, the spring 14 can generate an energizing force A in normal direction of a contact surface between the rotation regulating part 4c and the guide bar 12. A force to depress the lens holding frame 4g generated by the energizing force A functions as an energizing force to press the rotation regulating part 4c and the guide bar 12. Although the rotation regulating part 4c has a force to depress the guide bar 12 by the energizing force B, both ends of the guide bar 12 are attached and supported by a receiving part (not illustrated), and thus the position of the guide bar 12 does not change and a counterforce B' is generated. As shown in FIG. 3A, the energizing force A applied by the spring 14 is generated at a position separated from the rotation regulating part 4c in a longitudinal direction of the guide bar 12 (the energizing force A shifts to right side in the drawing). Accordingly, the energizing force A includes a force to rotate the lens holding frame 4g in the clockwise direction around the rotation regulating part 4c in the drawing. In other words, the lens holding frame 4g is energized so as to be tilted toward the guide bar 11 by using the rotation regulating part 4c as a fulcrum. This force generates an energizing force C in a lifting direction at the sleeve hole 4a and generates an energizing force D in a depressing direction at the sleeve hole 4b, and the lens holding frame 4g can be pressed by each of the energizing forces with respect to the guide bar 11 without the wobble. Moreover, the position of the guide bar 11 is not changed by the energizing forces C and D of the lens holding frame 4g because it is held by a fixed cylinder (not illustrated). Accordingly, the counterforce C' is generated at the sleeve hole 4a and the counterforce D' is generated at the sleeve hole 4b, whereby the position is held by a balance occurring between the counterforces B', C', D' and the energizing force A. As mentioned above, the sleeve hole 4a, the sleeve hole 4b, and the rotation regulating part 4c are each held with the energizing forces, whereby they can be energized without adding a particular energizing force from the rack 10.

As described above, it is possible to separately set the energizing force needed to regulate the rotation blur of the lens holding frame 4g and the energizing force to press the rack 10 to the motor screw, according to the present embodiment. Therefore, the rotation blur of the lens group can be regulated without increasing a rotation load of the motor. Additionally, this lens driving apparatus allows providing the lens barrel and the optical apparatus that cause almost no the image shake or the like and that have an excellent optical performance.

(Second Embodiment)

Next, a description will be given of the lens driving apparatus according to second embodiment of the present invention. Although a spring is used as the energizing member in the first embodiment, the lens driving apparatus according to the present embodiment differs from the first embodiment in that a magnet (Mg, magnetic material) is used as the energizing member. Note that, a configuration of the lens barrel itself in the present embodiment is basically similar to that in the first embodiment, and except for the parts related to the lens driving apparatus, the detailed description is omitted.

Figure 4:
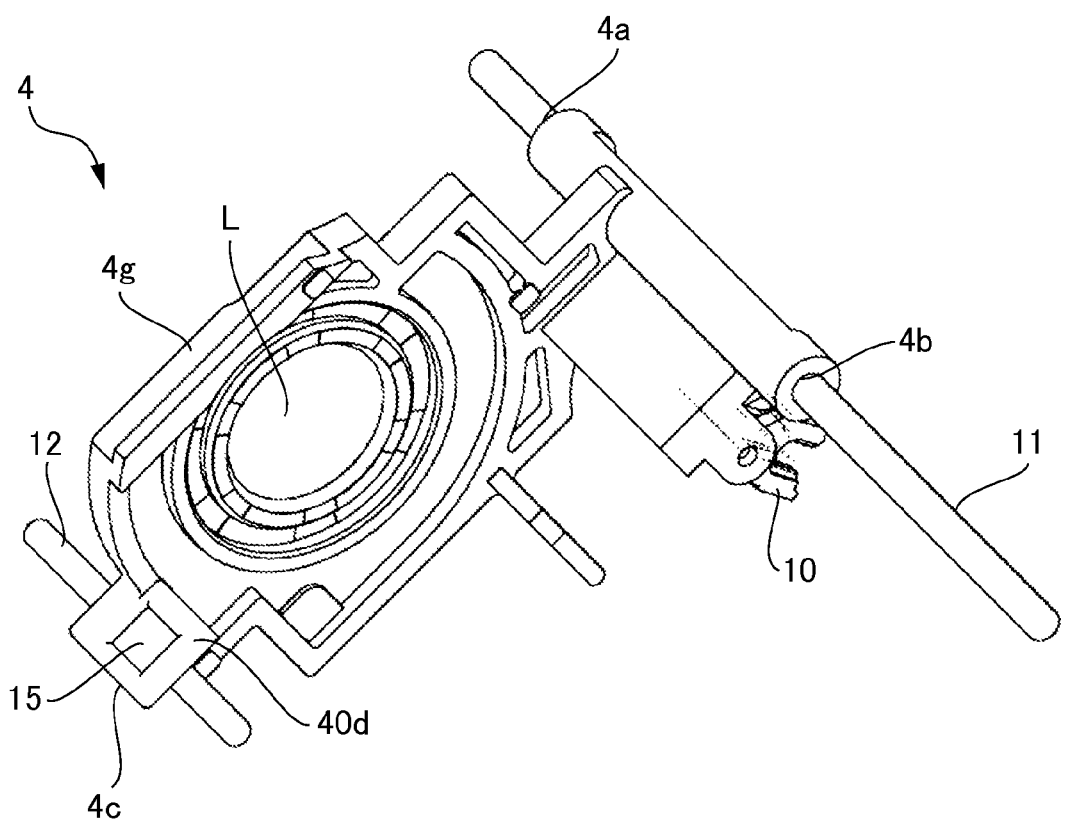
FIG. 4 is a perspective view that illustrates a configuration of the lens driving apparatus according to second embodiment of the present invention.

Here, a description will be given of a configuration of the lens driving apparatus according to the second embodiment of the present invention with reference to FIG. 4. The lens driving apparatus of the present embodiment includes the focusing lens group 4, the rack 10, the guide bar 11 (first guide part), the guide bar (second guide part), and a magnet 15 (energizing member, magnetic material). Note that, the same reference numerals are provided to the components that are the same as the components in the configurations as those in the first embodiment, and detailed description of those components are omitted. The magnet 15 is integrally held with respect to a magnet receiving part 40d provided in the lens holding frame 4g, and has a magnetic attracting force between the guide bar 12 and itself.

Figure 5A:
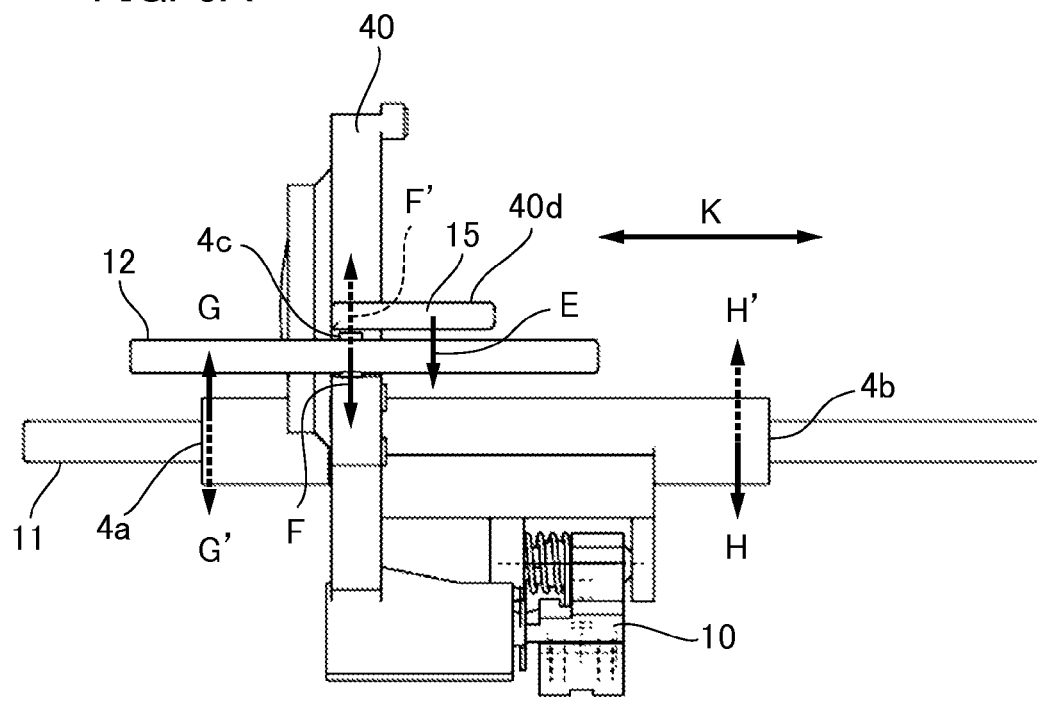
FIG. 5A is a side view of an explanatory view that explains the operation of the lens driving apparatus according to the second embodiment.
Figure 5B:
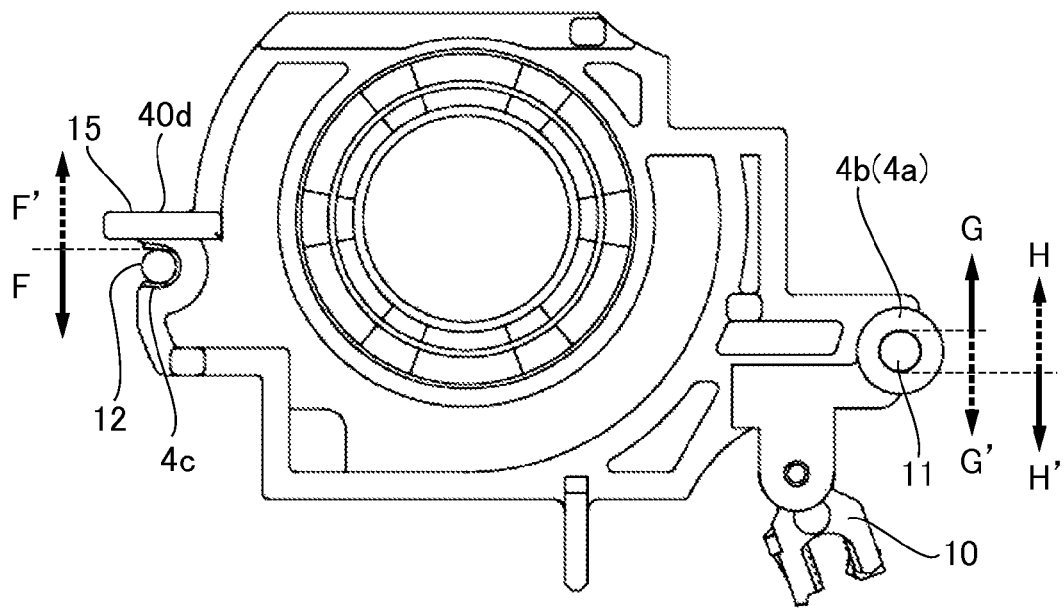
FIG. 5B is a front view of the explanatory view that explains the operation of the lens driving apparatus according to the second embodiment.

A detailed description will be given of the operation of such a lens driving apparatus with reference to FIGS. 5A and 5B. FIGS. 5A and 5B are explanatory views that explain the operation of the lens driving apparatus according to the second embodiment, FIG. 5A is a side view and FIG. 5B is a front view. As shown in FIGS. 5A and 5B, the magnet 15 is integrally held by the lens holding frame 4g and the magnetic attracting force occurring between the magnet 15, and the guide bar 12 generates an energizing force E. A force to depress the lens holding frame 4g generated by the energizing force E functions as an energizing force F between the rotation regulating part 4c and the guide bar 12. Although the rotation regulating part 4c has a force that depresses the guide bar 12 by the energizing force F, the both ends of the guide bar 12 are attached and supported by the receiving part (not illustrated), whereby the position of the guide bar 12 does not change and a counterforce F' is generated. As shown in FIG. 5A, the energizing force E applied by the magnet 15 is generated at a position separated from the rotation regulating part 4c in a longitudinal direction of the guide bar 12 (the energizing force E is offset to the right side in the drawing). Accordingly, the energizing force E includes a force that rotates the focusing lens group 4 in the clockwise direction around the rotation regulating part 4c in the drawing. This force generates an energizing force G in a lifting direction at the sleeve hole 4a and generates an energizing force H in a depressing direction, which is a direction opposite to that of the energizing force G, at the sleeve hole 4b, and the lens holding frame 4g can be pressed with each of the energizing forces with respect to the guide bar 11 without the wobble. Moreover, the position of the guide bar 11 is not changed by the energizing forces G, H of the lens holding frame 4g because it is held by the fixed cylinder (not illustrated). Accordingly, the counterforce G' is generated at the sleeve hole 4a, the counterforce H' is generated at the sleeve hole 4b, and the position is held by a balance that occurs between the counterforce F', G', H' and the energizing force E. As disclosed above, the sleeve hole 4a, the sleeve hole 4b, and the rotation regulating part 4c are each held by the energizing forces, whereby they can be energized without adding a particular energizing force from the rack 10.

As described above, according to the present embodiment, it is possible to separately set the energizing force needed to regulate the rotation blur of the lens holding frame 4g and the energizing force to press the rack 10 against the motor screw, in a manner similar to the first embodiment. Accordingly, the rotation blur of the lens group can be regulated without increasing the rotation load of the motor. Note that a case in which the magnet as the energizing member is provided on the guide bar 12 (regulating the clockwise rotation) is described in the present embodiment, but the present invention is not limited to this and the magnet may be provided under the guide bar 12.

Note that a case in which the focusing lens group is driven is described in the first and the second embodiments, but the present invention is not limited to this, and a case in which another lens group, for example, a variable power lens group is driven is allowed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-092366 filed Apr. 28, 2014, which is hereby incorporated by reference herein in its entirety.

What is claimed is:

1. A lens driving apparatus comprising:
a lens holding member that holds a lens and has a first contact part and a second contact part;
a rack provided in the lens holding member and that transmits a motor driving force to the lens holding member;
a first guide part that contacts the first contact part and supports the lens holding member so as to be movable back and forth in an optical axis direction of the lens;
a second guide part that contacts the second contact part and supports the lens holding member so as to be movable back and forth in the optical axis direction, the second guide part being farther positioned apart from the rack than the first guide part in a direction orthogonal to the optical axis direction; and
an energizing member that generates an energizing force in the direction orthogonal to the optical axis direction at a position apart from the second contact part in a longitudinal direction of the second guide part,
wherein the energizing force energizes one end of the first contact part with respect to the first guide in a first direction orthogonal to the optical axis direction and another end of the first contact part with respect to the first guide part in a second direction opposite to the first direction.

2. The lens driving apparatus according to claim 1, wherein the second contact part is a rotation regulating part that regulates a rotation of the lens holding member in the direction orthogonal to the optical axis direction.

3. The lens driving apparatus according to claim 1, wherein the energizing member generates an energizing force in a normal direction of a contact surface between the second contact part and the second guide part.

4. The lens driving apparatus according to claim 1, wherein the lens holding ember is energized so as to be tilted toward the first guide part using the second contact part as a fulcrum.

5. The lens driving apparatus according to claim 1, wherein the energizing member is an elastic member.

6. The lens driving apparatus according to claim 1, wherein the energizing member is a magnetic member.

7. A lens barrel comprising:
a lens group; and
a lens driving apparatus that moves the lens group in an optical axis direction,
wherein the lens driving apparatus comprises:
a lens holding member that holds a lens and has a first contact part and a second contact part;
a rack provided in the lens holding member and that transmits a motor driving force to the lens holding member;
a first guide part that contacts the first contact part and supports the lens holding member so as to be movable back and forth in an optical axis direction of the lens;
a second guide part that contacts the second contact part and supports the lens holding member so as to be movable back and forth in the optical axis direction, the second guide part being farther positioned apart from the rack than the first guide part in a direction orthogonal to the optical axis direction; and
an energizing member that that generates an energizing force in the direction orthogonal to the optical axis direction at a position apart from the second contact part in a longitudinal direction of the second guide part,
wherein the energizing force energizes one end of the first contact part with respect to the first guide part in a first direction orthogonal to the optical axis direction and another end of the first contact part with respect to the first guide part in a second direction opposite to the first direction.

8. An optical apparatus comprising:
a camera;
a lens barrel demountable from the camera and having a lens group; and
a lens driving apparatus that moves the lens group in an optical axis direction,
wherein the lens driving apparatus comprises:

a lens holding member that holds a lens and has a first contact part and a second contact part;

a rack provided in the lens holding member and that transmits a motor driving force to the lens holding member;

a first guide part that contacts the first contact part and supports the lens holding member so as to be movable back and forth in an optical axis direction of the lens;

a second guide part that contacts the second contact part and supports the lens holding member so as to be movable back and forth in the optical axis direction, the second guide part being farther positioned apart from the rack than the first guide part in a direction orthogonal to the optical axis direction; and an energizing member that that generates an energizing force in the direction orthogonal to the optical axis direction at a position apart from the second contact part in a longitudinal direction of the second guide part, wherein the first contact part includes two openings, and wherein the energizing force energizes the first contact part in the direction orthogonal to the optical axis direction in an opposing direction with respect to the energizing force energizing the first guide part, wherein the energizing force energizes one end of the first contact part with respect to the first guide part in a first direction orthogonal to the optical axis direction and another end of the first contact part with respect to the first guide part in a second direction opposite to the first direction.

* * * * *